July 14, 1936.　　E. G. BEIDERMAN　　2,047,573
ELECTRIC WELDING
Filed May 20, 1935　　2 Sheets-Sheet 1
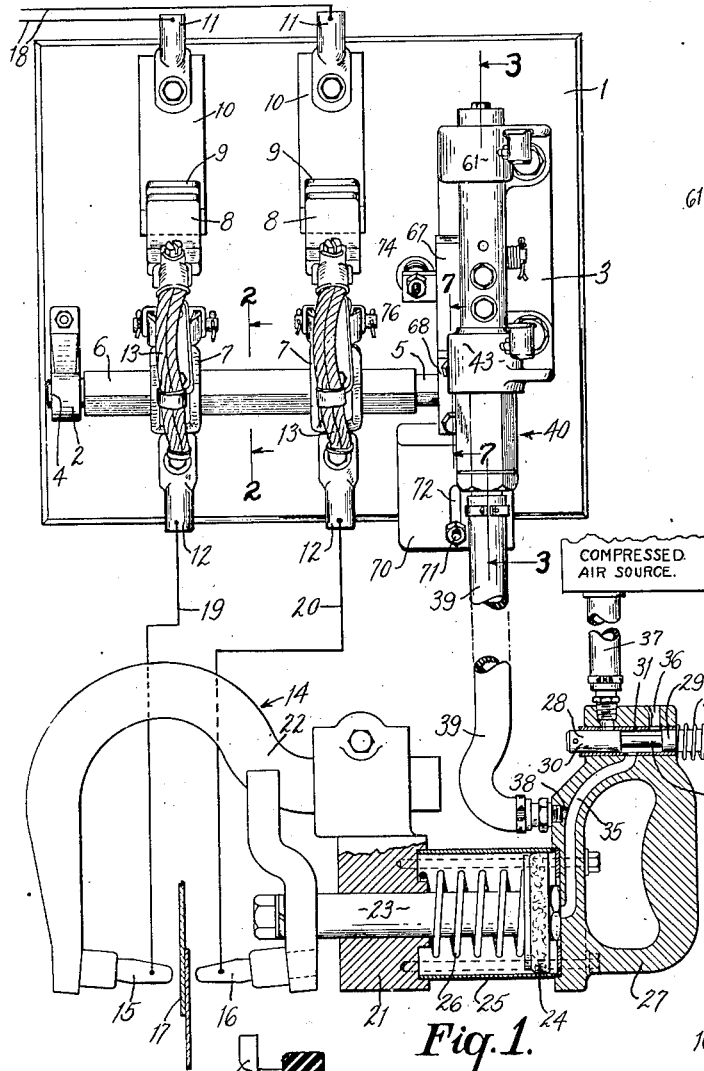
INVENTOR.
Edward G. Beiderman.
BY Slough and Canfield
ATTORNEY.

July 14, 1936.  E. G. BEIDERMAN  2,047,573
ELECTRIC WELDING
Filed May 20, 1935   2 Sheets-Sheet 2

INVENTOR.
Edward G. Beiderman.
BY Slough and Canfield
ATTORNEY.

Patented July 14, 1936

2,047,573

UNITED STATES PATENT OFFICE 2,047,573

ELECTRIC WELDING

Edward G. Beiderman, Detroit, Mich., assignor to The Clark Controller Company, Cleveland, Ohio, a corporation of Ohio Application May 20, 1935, Serial No. 22,407

3 Claims. (Cl. 219—4)

This invention relates to electric switches for controlling the duration of electric currents in electric circuits, particularly circuits in which impulses of short duration are utilized for various purposes, such for example as electric spot-welding.

The invention is particularly advantageous for controlling the duration of electric welding current when it is applied to the work to be welded by a hand-operated spot-welding tool or device and the invention will therefore be described herein in association with a welding apparatus of that character, although the invention is applicable to other types of welding apparatus and applicable to other arts than welding which utilize electric currents of timed duration.

In one general class of welding apparatus, a welding device having jaw type electrodes is presented to the work to be welded to dispose the work between the jaws; a valve or other means on the device is then operated by the operator to admit fluid under pressure to the device to move the jaws to grip the work; and an electric switch is closed at the proper instant and for a suitable length of time to send a welding current impulse over a suitable circuit through the jaws and the work to effect the weld; the jaws may thereafter be released by releasing the fluid pressure applied to the device.

It is an object of the present invention to provide an improved electric switch for controlling the welding current supplied to a welding device, the switch and device being both operable by fluid under pressure controlled by the device operator.

Another object is to provide an electric switch of the class referred to having improved means to cause the device to be operated by the fluid pressure before operation of the switch.

Another object is to provide a switch of the class referred to having improved means to effect instantaneous restoring of the switch upon interruption of the fluid pressure.

Another object is to provide an electric contactor or switch having improved means to effect operation thereof for a predetermined time interval only.

Another object is to provide an improved switch mechanism for controlling an electric circuit to energize the same with current impulses of timed duration.

Another object is to provide an electric switch having improved mechanism associated therewith of the fluid pressure operable type for effecting operation of the switch and for causing the switch to remain operated for a short predetermined period of time and then to be restored.

Another object is to provide an improved fluid pressure operable mechanism for controlling the operation of an electric switch and having improved means to effect rapid restoring of the fluid pressure operable mechanism.

Another object is to provide, in an electric switch having means to operate it to energize an electric circuit with current impulses of short duration, improved means for adjustably timing the duration of the impulses.

Other objects will be apparent to those skilled in the art to which my invention appertains.

My invention is fully disclosed in the following description taken in connection with the accompanying drawings, in which:

Fig. 1 is a front elevational view of a pneumatically operable electric switch or contactor and magnetically operable welding gun associated therewith and embodying my invention;

Fig. 2 is a sectional view taken from the plane 2—2 of Fig. 1;

Fig. 5 is a view similar to a part of Fig. 3 illustrating parts thereof in another operated position;

Fig. 8 is a fragmentary view similar to a part of Fig. 1 illustrating a modification.

Figure 4:
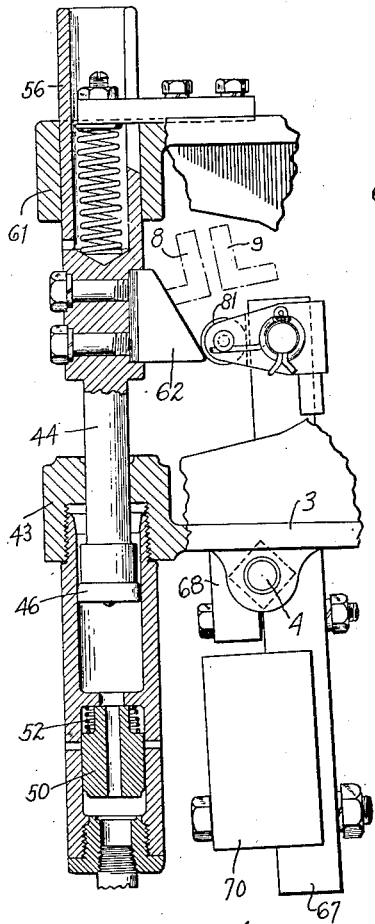
Fig. 4 is a view similar to a part of Fig. 3 illustrating parts thereof in an operated position.

Referring to the drawings, I have shown at I a base or panel preferably of insulating material, having spaced bearing brackets 2 and 3 upon which is oscillatably supported the rounded ends 4—4 of a shaft 5, a part of the length of which has telescoped thereon an insulating tube 6. Switch arms 7—7 are clamped on the shaft 5 and carry contacts 8—8 engageable with stationary contacts 9—9 mounted upon terminal blocks 10—10 on the panel 1 to which are connected terminals 11—11. Terminals 12—12 secured to the panel are connected by flexible leads 13—13 to the contacts 8—8.

The parts just described constitute an electric switch or contactor of well known form whereby upon rotation of the shaft 5 clockwise as viewed in Fig. 2, contacts 8 and 9 will be engaged and vice versa will be disengaged to control current in conductors connected to the terminals 11 and 12. The details of construction of the contactor constitute no essential part of my invention. Any suitable construction may be employed, the preferred construction having the elements thus far described.

At 14 is illustrated generally a welding device having stationary and movable electrodes 15 and 16, the movable electrode 16 being adapted to be moved, in a manner to be described, to compress, between the electrodes, work illustrated at 17 to be welded. The electrodes 15 and 16 are supplied with welding current supplied by the diagrammatically illustrated circuit including supply mains 18—18 connected to the switch terminals 11—11 and wires 19 and 20 connected respectively to the electrodes 15 and 16 and to the terminals 12. As will be understood, when the switch shaft 5 is oscillated to engage contacts 8 and 9, current will flow from the supply mains 18 to one electrode, through the work 17 and by way of the other electrode back to the other side of the line, to effect a weld at the work 17, and this current may be supplied from any suitable source such as the low voltage secondary of an alternating current transformer.

The construction of the device 14 by which the electrode 16 may be pressure-moved, is not essential to the instant invention. Any of the well known pneumatically operated welding devices of this general type may be utilized. In the form illustrated, the device comprises a body 21 in which is clamped a shank 22 supporting the electrode 15 and in which is reciprocable a piston rod 23 carrying at its outer end the electrode 16 and at its inner end connected to a piston 24 reciprocable in a cylinder 25. A spring 26 normally holds the piston 24 toward the right or electrode-disengaged position; and compressed air may be admitted to the other side of the piston 24 to propel it in the cylinder to engage the electrodes against tension of the spring 26.

A handle 27 for the device operator has reciprocable in a bore therein, a valve 28 of the piston valve type having piston portions 29 and 30 substantially sealing the bore 31 and an interconnecting neck 32. The valve 28 is normally disposed in an off position by a spring 33 abutting upon the handle at one end and upon an operator's valve button 34 at the other end; and in this position effects communication, by way of a duct 35 in the handle, from the cylinder 25 through the bore 31 around the neck 32 to atmosphere by way of an outlet duct 36.

When the operator presses the button 34, the valve 28 is moved over toward the left as viewed in the drawings, and first closes off the outlet 36 and then effects communication of the duct 35 with a conduit 37 connected to a source of air under pressure; thereupon, the compressed air flows by way of the duct 35 to the cylinder 25 and operates the piston for the purpose described. Any suitable means may be provided as the source of compressed air referred to, and the conduit 37 is preferably a flexible hose and may be of well known construction.

A branch duct 38 communicates with the duct 35 and with another preferably flexible hose type conduit 39. The conduits 39 and 37 may be connected to the handle 27 by suitable threaded nipples thereon screwed into threaded bores in the handle as illustrated. The conduit 39 communicates with a cylinder and piston type pneumatic device to be described mounted on the panel 1, and the conduit 39 as well as the conduit 37 is of suitable length so that the panel 1 may be stationarily mounted on a wall, column or the like and the device freely movable by the operator from point to point along his work. Furthermore, the conduit 39 may be intentionally provided of preselected inside diameter or may be of intentionally increased length for a purpose to be described.

Referring now to the pneumatic device 40, at 41 is a pneumatic cylinder the lower end of which is closed by a plug 42 threaded to receive a nipple on the end of the conduit 39, and the upper end of which is threaded into a boss 43 on the bearing bracket 3 above referred to which is secured to the panel 1.

A piston rod 44 is reciprocable in a bore 45 in the boss 43 and carries on its lower end a piston 46 fitting the bore 47 of the cylinder. The lower portion of the cylinder is separated from the upper portion by a partition 48 having a perforation 49 therein, and, in the lower part of the cylinder, a piston-like valve 50 is reciprocatively fitted, normally resting at its lower end upon the upper end of the plug 42 and at its upper end portion provided with a shoulder 51 upon which one end of a spring 52 abuts, the other end of the spring abutting upon the partition 48.

Exhaust ports 53—53 are provided extending through the cylinder wall and communicating with the interior of the cylinder at a point just above the shoulder 51; and the valve 50 has a duct 54 extending longitudinally therethrough. The operation of these parts will presently be described.

The upper end of the piston rod 44 is enlarged into a head 65 above the boss 43, providing a shoulder 55 resting upon the upper side of the boss 43 and supporting the piston rod and piston and the parts of the piston rod above the shoulder. These parts comprise an upwardly open tubular spring housing 56, housing a spring 57 the lower end of which abuts upon a shoulder 58 in the housing and the upper end of which abuts upon a finger 59 extending into the tubular housing through a slot 60 and connected to the bracket 3. The bracket 3 has also an upper boss 61 in a bore of which the tubular extension 56 is reciprocatively supported. The head 65 has secured thereto a cam 62 of the inclined plane type seated in a recess 63 in the head, and secured in the recess by bolts 64—64 projected through the head and threaded into the cam, and a plurality of shims 95—95 is provided at the bottom of the recess to adjustably position the cam laterally of the head.

The operation of the pneumatic device thus far described is as follows. When compressed air is supplied through the conduit 39, pressure thereof will at once lift the valve 50, causing it to cut off exhaust through the ports 53—53 and compressing the spring 52; the compressed air, then holding the valve 50 in its upper position, will flow through the duct 54 and perforation 49 to the lower side of the piston 46 and will lift the piston and its piston rod 44 and the head 65 against pressure of the spring 57, giving a quick upward thrust to the cam 62, and holding the piston and head 65 in the upper position, which position may be determined by a shoulder 66 on the piston rod 44 in the cylinder 41.

When the pressure in the conduit 39 is released, the spring 52 will instantaneously restore the valve 50, downwardly, opening the ports 53—53 thereby releasing pressure under the piston 46 whereupon the spring 57 will instantaneously push the head 65 and piston rod 44 and piston 46 downwardly, engaging the shoulder 55 with the upper side of the boss 43, thus restoring the parts to their normal positions.

The above described operation is that which occurs when the valve 34 is operated rapidly, as in ordinary practice. If, however, the valve 34 be retained in its operated position for a substantial though short interval of time, the pressure in the cylinder 41 which is communicated to the upper side of the valve 50 will obviously become equal to the pressure on the underside of the valve 50, and the valve will be returned downwardly to its normal position by the spring 52, thereafter the piston 46 being held in its operated or upper position by reduced air pressure, since some of the applied pressure is released outwardly through the ports 53—53 so that the return spring 57 substantially balances the upward thrust of the air pressure on the piston, with the air pressure of course predominating to insure reliable operation. If, now, the valve 34 be released, the piston 46 will immediately descend to its normal position exhausting the slight remaining pressure outwardly through the ports 53—53. The quick return of the piston thus effected by the release of pressure thereunder by the valve 50 occurs substantially without retardation and the next successive operation may be made in a very short interval of time thereafter.

Figure 3:
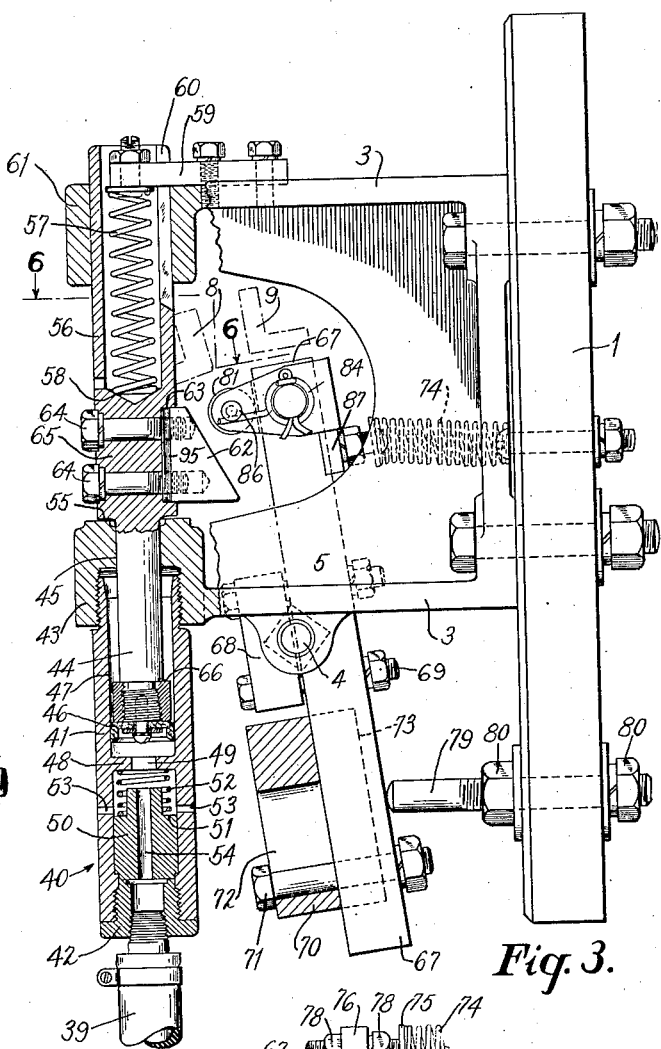
Fig. 3 is a view partly in section taken from the plane 3—3 of Fig. 1 and drawn to an enlarged scale and illustrating parts thereof in their normal or restored positions.
Figure 7:
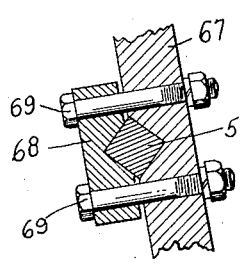
Fig. 7 is a fragmentary view to an enlarged scale taken from the plane 7—7 of Fig. 1.

An arm 67 is rigidly secured to the shaft 5 in any suitable manner, for example by a clamp element 68 and bolts 69—69 as shown in Fig. 7. The weight element 70 is rigidly secured to the arm 67 below the shaft and is preferably adjustably movable thereon to vary its distance from the shaft axis, which adjustment may be provided by a bolt 71 extending through a slot 72 in the weight and through a perforation in the arm 67 and the weight may have a wing 73 engaging the side of the arm 67 to position it, the weight being clamped to the arm by the head and nut of the bolt 71. It will be observed that the center of gravity of the weight 70 is approximately directly under the axis of the shaft 5, the axis of the shaft being at the center of the round end 4 of the shaft as shown in Fig. 3. It will also now be apparent that the arm 67 will oscillate in unison with the shaft 5.

Figure 6:
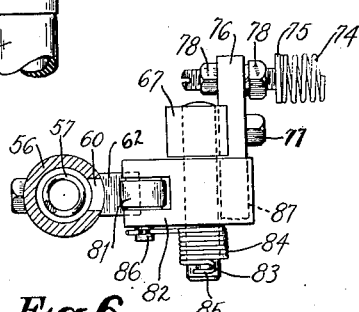
Fig. 6 is a fragmentary view taken approximately from the plane 6—6 of Fig. 3.

A spring 74 abuts at one end upon the panel I and at its other end upon the head of a stud 75 threaded into a lug 76 in the arm 67, which lug is preferably a separate piece secured to the arm 67 by a screw 77 as shown in Fig. 6. The spring 74 thus constrains the arm 67 and therefore the shaft 5 and its switch arms 7—7 to a counter-clockwise position as viewed in Fig. 3. The tension of the spring 74 may be adjusted by turning the stud 75 and locking it by nuts 78—78. The position of the arm 67 is determined by an adjustable stop 79 projected through a hole in the panel I, and adjustably positioned longitudinally and fixed on the panel by nuts 80—80, the end of the post 79 abutting the arm 67 below the shaft.

Above the shaft 5, the arm 67 has mounted thereon a cam follower in the form of a roller 81, rotatably supported in a forked pawl 82 which in turn is pivoted on a pin 83 mounted on the arm 67. A coil spring 84 wound around the pin 83 and secured at one end thereto as at 85, has the other end engaging the underside of a pin 86 on the pawl 82 constraining the pawl to rotate clockwise as viewed in Fig. 3; and the pawl is stopped against clockwise rotation by engaging a portion 87 of the lug 76 but is free to rotate counter-clockwise.

The operation of the above-described apparatus will now be described. The normal position of the parts is that shown in Figs. 1, 2 and 3. The operator, preparing to make a weld, places the electrodes 15 and 16 relative to the work 17 as shown in Fig. 1 and then presses the valve button 34. Compressed air flows from the source through the conduit 37 through the duct 35 and, operating the piston 24, compresses the work between the electrodes with the desired welding pressure. Compressed air at the same time also flows from the conduit 37 through the ducts 35 and 38 to the conduit 39, and as above described in connection with Fig. 3, raises the valve 50 to close the escape ports 53 as shown in Fig. 4, and shoots the piston and piston rod 44 upwardly against the pressure of the spring 57, giving a quick upward thrust to the cam 62. The cam 62 engages the roller cam follower 81 and rides thereover giving a clockwise impulse to the arm 67 against the pressure of the spring 74.

Before this impulse is given to the arm 67, the contacts 8 and 9 are in their full open position as shown in broken lines in Fig. 3. As the arm 67 moves, the contacts approach each other as shown in Fig. 4. The upward impulse on the cam 62 carries it above and beyond the roller 81.

In the preferred mode of operation, the cam 62 leaves the roller 81 on its up stroke before the contacts 8 and 9 engage each other, and the arm 67 continues to move clockwise as viewed in Fig. 3 due to its inertia which of course is largely determined by the weight 70; thus after the cam leaves the roller, the arm 67 continues to move, carries the contact 8 into engagement with the contact 9. The inertia is finally absorbed by the spring 74 in its effort to return the arm 67 and by the pressure reaction of the contacts 8 and 9, then the spring 74 restores the arm 67 against its stop 79 disengaging the contacts 8—9.

By adjustably moving the weight 70 toward or from the shaft axis as above described, or by adjustably changing the mass thereof, the inertia may be varied and thus the time duration of contact engagement and the corresponding duration of the current impulse therethrough may be varied adjustably. Similarly, the duration of the impulse may be varied by adjusting the spring 74 which absorbs a part of the inertia and accelerates the weight 70 in the restoring direction.

Again, the duration of the impulse may be varied by adjustably changing the position of the cam 62 by adjustment of the shims 95, more shims causing the cam to engage the roller for a longer period and thus giving greater acceleration to the mass 70 and vice versa.

By this means as will now be clear, the contacts are engaged for a predetermined time interval and a current impulse of predetermined duration flows over the electric circuit above described through the electrodes 15 and 16 to effect a weld at the work. So long as the device operator holds the button 34 in its depressed position, the cam 62 will remain in its upper position and the contacts having delivered a single impulse will remain open due to the fact that air pressure is maintained in the cylinder 41.

Having completed a weld, the operator will now release the button 34 and the valve 28 will move back to its normal position, shutting off pressure from the source and exhausting pressure from the device, and from the conduit 39 through the duct 35 and out by the outlet 36. Thereupon the spring 57 will restore downwardly the piston rod 44 and the cam 62 and the cam will then ride over the roller follower 81, rocking the pawl 82 out of its path as illustrated in Fig. 5. When the cam has passed the roller, the roller will be returned to its normal position by the spring 84.

As described hereinbefore, if the operator holds the button 34 in operative position after the piston rod 44 has reached the top of its stroke and the pressure on opposite sides of the valve 50 becomes equalized, the valve 50 will return downwardly and reduce pressure under the piston by leakage through the ports 53—53, so that when subsequently the valve is released, the piston will return downwardly substantially without retardation due to air pressure thereunder.

It is one of the particular advantages of my invention that the contacts 8 and 9 will close to supply the current impulse always after the electrodes 15 and 16 have pressure-engaged the work which results from supplying the air pressure to the switch-operating cylinder 41 through a conduit 39 of substantial length whereas the cylinder 25 of the device is supplied by pressure directly. A period of time must elapse while the pressure in the conduit 39 and cylinder 41 builds up to a value sufficient to operate the switch. This time delay may be effected by the resistance to air flow through the conduit 39 and by the volumetric capacity thereof which must be satisfied before the pressure will rise to the switch-operating value and a length of conduit and diameter of conduit 39 may be provided that will effect a sufficient delay in building up of pressure therein as described.

Switches of usual construction such as that shown in Fig. 2 generally mount the moving contact 8 on a supplemental arm 90 rendered yieldable by a spring 91 whereby the engagement of the contacts 8 and 9 is cushioned. The spring 91 naturally exerts a resilient force tending to oppose the switch-closing force and thus is a part of the load which the inertia above referred to must overcome and thus may be considered as a part of the force exerted by the spring 76 during the period of actual engagement of the contacts 8 and 9, but when once determined is constant and is accounted for when the inertia-producing elements above described are adjusted.

In the foregoing, I have illustrated and described an apparatus utilizing compressed air to operate the welding device and to operate the electric contactor. In some aspects my invention is in no sense limited to compressed air as the fluid for operating the apparatus. Obviously, other gases than air under pressure can be employed, in which case the fluid pressure source connected to the conduit 37, Fig. 1, would be any compressed gas source instead of the "compressed air source" illustrated. Furthermore, my invention may be practiced with fluid of liquid form. In such case it may be desirable to provide conduit means to conduct away from the device and away from the cylinder 41 the liquid discharged therefrom in the operation of the apparatus, and such an arrangement is shown in Fig. 8. The construction of the apparatus in this figure will be seen to be the same as that in the other figures except that the source of compressed air is replaced by a source of liquid under pressure indicated at 100; the exhaust ports 53—53 discharge into an annular conduit 101 with which communicates a discharge conduit 102 through which liquid discharged through the ports 53—53 may be conducted away; and the outlet duct 36 of the gun communicates with a discharge conduit 103 by which the liquid discharged in the operation of the gun may be carried away.

It will be apparent, therefore, that my invention may be practiced with gas or liquid fluid and it is intended that the word "fluid" and derivatives thereof in the appended claims are to be interpreted with this meaning.

My invention is not limited to the exact details of construction shown and described. Changes and modifications may be made within the spirit of my invention and without sacrificing its advantages and within the scope of the appended claims.

Subject matter described and illustrated in the application but not claimed is being claimed in a co-pending application, Serial No. 84,981, filed June 13, 1936, for improvements in Time controlled electric switches.

I claim:

1. In an electric spot welder, the combination of a pair of electrodes, an air cylinder and piston for forcing the electrodes towards each other, a welding circuit, said circuit including a switch, means for opening said switch, a source of pneumatic pressure communicating with the said air cylinder, a second air cylinder and piston connected with said source, timing apparatus for said switch operated by air pressure delivered to said second cylinder, a relief valve immediately adjacent said second cylinder operable at the end of a given traverse of said second piston for releasing the pressure in said second cylinder and permitting substantially unretarded return movement of the piston in the second cylinder, and means for so returning said piston.

2. In an electric spot welder, the combination of a pair of electrodes, an air operated device for forcing the electrodes toward each other, a welding circuit, said circuit including a switch, a source of pneumatic pressure communicating with said device, an air cylinder and piston communicating with said source, timing apparatus for said switch operated by air pressure delivered to the cylinder, an automatic relief valve operable after a predetermined traverse of the piston for relieving the pressure in said cylinder and permitting quick return movement of the piston in the cylinder.

3. In an electric spot welder, the combination of a pair of electrodes, an air operated device for forcing the electrodes toward each other, a welding circuit, said circuit including a switch, a source of pneumatic pressure communicating with said device, an air cylinder and piston communicating with said source, timing apparatus for said switch operated by air pressure delivered to the cylinder, an automatic relief valve adjacent said cylinder operable after a predetermined traverse of said piston for relieving pressure in the cylinder and permitting quick substantially unretarded return movement of the piston in the cylinder.

EDWARD G. BEIDERMAN.